United States Patent
Farris et al.

(10) Patent No.: US 10,730,231 B2
(45) Date of Patent: Aug. 4, 2020

(54) METHOD OF MAKING FOAMS USING PARTIAL MOLDS

(71) Applicant: NIKE, Inc., Beaverton, OR (US)

(72) Inventors: Bryan N. Farris, North Plains, OR (US); David Turner, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 128 days.

(21) Appl. No.: 16/120,395

(22) Filed: Sep. 3, 2018

(65) Prior Publication Data

US 2018/0370115 A1 Dec. 27, 2018

Related U.S. Application Data

(63) Continuation of application No. 14/924,263, filed on Oct. 27, 2015, now Pat. No. 10,065,368.

(60) Provisional application No. 62/075,529, filed on Nov. 5, 2014.

(51) Int. Cl.
| | | |
|---|---|---|
| *B29C 64/30* | (2017.01) | |
| *B29C 44/02* | (2006.01) | |
| *B29C 44/44* | (2006.01) | |
| *B29C 64/106* | (2017.01) | |
| *B29C 35/02* | (2006.01) | |
| *B33Y 10/00* | (2015.01) | |
| *B33Y 80/00* | (2015.01) | |
| *B29C 44/34* | (2006.01) | |
| *B29C 64/00* | (2017.01) | |

(52) U.S. Cl.
CPC ............ *B29C 64/106* (2017.08); *B29C 35/02* (2013.01); *B29C 44/348* (2013.01); *B29C 44/3453* (2013.01); *B29C 64/00* (2017.08); *B33Y 10/00* (2014.12); *B33Y 80/00* (2014.12)

(58) Field of Classification Search
CPC ..... B29C 64/106; B29C 64/00; B29C 44/025; B29C 44/348; B29C 44/58; B29C 44/3453; B33Y 10/00; B33Y 80/00
See application file for complete search history.

(56) References Cited

U.S. PATENT DOCUMENTS

| | | |
|---|---|---|
| 3,919,445 A | 11/1975 | Smarook |
| 5,158,986 A | 10/1992 | Cha et al. |
| 5,684,055 A | 11/1997 | Kumar et al. |
| 6,232,354 B1 | 5/2001 | Tan |
| 6,245,267 B1 | 6/2001 | Kreiser et al. |
| 7,994,231 B2 | 8/2011 | Jacobs et al. |
| 8,808,489 B2 | 8/2014 | Taylor |
| 9,079,337 B2 | 7/2015 | Lipton et al. |
| 2004/0070098 A1 | 4/2004 | Arai |
| 2009/0126225 A1 | 5/2009 | Jarvis |
| 2010/0291369 A1 | 11/2010 | McEvoy et al. |
| 2012/0241993 A1 | 9/2012 | Lipton et al. |
| 2014/0114457 A1 | 4/2014 | McDowell et al. |
| 2014/0182170 A1 | 7/2014 | Wawrousek et al. |

FOREIGN PATENT DOCUMENTS

| | | |
|---|---|---|
| CN | 104097288 A | 10/2014 |
| EP | 1407868 A2 | 4/2004 |
| EP | 2564719 A1 | 3/2013 |
| TW | 595541 U | 6/2004 |
| TW | 200946575 A | 11/2009 |
| WO | 2013106854 A1 | 7/2013 |
| WO | 2014015037 A2 | 1/2014 |
| WO | 2015177571 A1 | 11/2015 |

OTHER PUBLICATIONS

Nov. 15, 2019—(EP) ESR—App. No. 19196689.4.

*Primary Examiner* — Kara B Boyle
(74) *Attorney, Agent, or Firm* — Banner & Witcoff, Ltd.

(57) ABSTRACT

A method of making a foamed article, for example a foamed component for an article or footwear, comprises depositing an unfoamed, thermoplastic polymer onto a support surface in a three-dimensional printing process to form an unfoamed article; heating the article to soften the article and infusing the softened article with at least one inert gas at a first pressure greater than atmospheric pressure that is sufficient to cause the at least one inert gas to permeate into the softened article; and reducing the pressure to second pressure below the first pressure while the article is softened to at least partially foam the article, wherein a surface of a partial mold limits foam expansion in at least one direction but less than all directions. The article or a part of the article may be made by printing a thermoplastic polymeric material with a three-dimensional printer in a structure of interconnected, unfoamed, thermoplastic polymeric members spaced to define openings between the thermoplastic polymeric members.

20 Claims, 6 Drawing Sheets

METHOD OF MAKING FOAMS USING PARTIAL MOLDS

This application is a continuation of U.S. patent application Ser. No. 14/924,263, filed Oct. 27, 2015, which claims priority to U.S. Provisional Application No. 62/075,529, filed Nov. 5, 2014, which applications are incorporated herein in their entirety by reference.

FIELD

The present disclosure relates to methods for forming foams, particularly flexible foams, using molds and articles made by the methods.

INTRODUCTION

This section provides background information related to the present disclosure which is not necessarily prior art.

Flexible foams are used for cushioning, support, and to absorb impacts, for example in seats and furniture, footwear, packaging, straps, protective gear, and so on. In general, foam materials are made in sheets or blocks and cut to a desired pre-form shape, then finished to a final shape.

Foamed midsoles for athletic footwear may be made from crosslinked poly(ethylene co-vinyl acetate) (EVA), for example, which may be cut from a block or sheet of foam.

Injection molding may typically not be used because foam materials made by this method must have higher specific gravities to foam uniformly. A new mold must be made to injection mold a midsole of a new design.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings. The figures are representative of embodiments according to the disclosed technology, but are not necessarily shown to scale.

DESCRIPTION

A method of making a closed-cell foamed article, for example a foamed component for an article or footwear, comprises providing an unfoamed, thermoplastic polymeric article; heating the article to soften the article and infusing the softened article with at least one inert gas at a first pressure that is sufficient to cause the at least one inert gas to permeate into the softened article; and, while the article is softened, reducing the pressure to second pressure below the first pressure to at least partially foam the article, wherein a surface of a partial mold limits foam expansion in at least one direction but less than all directions. The unfoamed article may be provided by depositing unfoamed, thermoplastic polymer onto a support surface in a three-dimensional printing process to form the unfoamed article. The unfoamed article may comprise interconnected, unfoamed, thermoplastic polymeric members spaced to define openings therebetween. Alternatively, an unfoamed article infused with at least one inert gas may be provided, then heated at a first pressure to soften the article followed by a reduction in pressure so that the softened article at least partially foams, again using a partial mold to limit foam expansion in at least one direction but less than all directions during the foaming step. A partial mold does not fully enclose the article during foaming. As the article is not fully enclosed during the foaming, the infused gas present in the article is able to escape from at least a portion of an outer surface of the article, and from the partial mold. The partial mold may be adjacent to the article before foaming begins or the article may come into contact with a surface of the partial mold during foaming to prevent the article from expanding further during foaming in the direction of the surface of the partial mold. The surface of the partial mold that limits foam expansion may be flat and may optionally include one or more spaces through which the structure can expand beyond the surface during foaming. The outer surfaces of the article before the foaming may define a top, a bottom opposite the structure top, and an outer circumference between the top and the bottom, and the surface of the partial mold may limit foam expansion of at least a part of the outer circumference. The surface of the partial mold may limit foam expansion to expansion in directions of the top or the bottom or both the top and the bottom. In another example, the partial mold may have a bottom surface and a side surface or side surfaces that limit foam expansion and may be open in a direction opposite the bottom surface. The partial mold may include a bottom portion and a side portion, and the side portion may or may not completely surround the article being foamed. The partial mold may have adjacent sections that separate during foaming of the article. For example, the partial mold may have a first mold part comprising the bottom surface and a second mold part comprising the side surfaces, wherein the first and second mold parts are adjacent but not conjoined, in which case the second mold part may be moved away from the first mold part before unmolding the foamed article from the second mold part. The partial mold may be in place before the unfoamed, thermoplastic polymer is deposited onto a support surface to form the article or may be put into position after the three-dimensional printing process but before heating the article to cause the at least one inert gas to permeate into the softened article.

In any of these examples, the partial mold may have a surface that imparts a pattern or decoration on at least a portion of the foamed article. In any of these examples, the partial mold may have a shape of a midsole for footwear. The shape may be that of a perimeter of a midsole or a part of a perimeter of a midsole. In any of these examples, the partial mold may be of a sacrificial nature that is destroyed in removing the molded, foamed article. For example, the partial mold or a portion of the partial mold may be cut away or torn away after the article is molded. In another example, the partial mold or a portion of the partial mold may be melted or dissolved after the article is molded. In yet another example, the partial mold or a portion of the partial mold may become a part of the foamed article, for example the partial mold or a portion of the partial mold may be may become a layer or component of a midsole for footwear that is foamed and shaped by the partial mold. In such instances, the partial mold or a portion of the partial mold may be adhesively attached or physically attached during the foaming and molding process. In any of these examples, the foamed article may be heated to soften the article a second time, infused with a second at least one inert gas at a third pressure that is sufficient to cause the second at least one inert gas to permeate into the softened article; then the pressure is reduced while the first polymeric resin is or remains softened to further foam the article, optionally again using a partial mold to limit foam expansion in at least one direction but less than all directions. Examples of articles that may be made by these methods are footwear uppers, footwear collars, footwear tongues, footwear insoles, footwear midsoles, shinguards, shoulder pads, chest protectors, masks, helmets, headgear, knee protectors, articles of clothing, straps, furniture cushions, and bicycle seats and foamed components for such articles.

Also disclosed is a method of making a closed-cell foamed article, for example a foamed component for an article or footwear, comprising providing an unfoamed, thermoplastic polymeric article infused with at least one inert gas; heating the article to soften the article at a first pressure and, while the article is softened, reducing the pressure to second pressure below the first pressure to at least partially foam the article, wherein a surface of a partial mold limits foam expansion in at least one direction but less than all directions.

A method of making a foamed article, for example a foamed component for an article or footwear, comprises heating a thermoplastic article, which may comprise interconnected, unfoamed, thermoplastic polymeric members, the article being infused with at least one inert gas, to a first temperature to soften the article to at least partially foam, wherein a surface of a partial mold limits foam expansion in at least one direction but less than all directions. The thermoplastic article may be made of a thermoplastic elastomer composition. The thermoplastic article may be infused with inert gas below or up to a saturation point. In other words, the thermoplastic article may be infused with the inert gas at a concentration below the saturation point, or at the saturation point. When the article includes interconnected, unfoamed, thermoplastic polymeric members, the first temperature is below a temperature at which the structure would collapse but high enough to soften the thermoplastic article and allow the thermoplastic article to at least partially foam, wherein a surface of a partial mold limits foam expansion in at least one direction but less than all directions. The partial mold may have a flat surface, or may have a curved surface, or may have at least one flat and at least one curved surface, and may optionally contain spaces through which the foam may expand.

When the article includes unfoamed, thermoplastic polymeric members, they are spaced to define openings between the unfoamed, thermoplastic polymeric members. Each opening may have at least one dimension that is greater than at least one dimension of at least one adjacent unfoamed thermoplastic polymeric member. All or some of the openings may be interconnected. Thermoplastic polymeric members may enclose all or some of the openings. After the thermoplastic polymeric members at least partially foam, openings may remain between a portion of or between all of the thermoplastic polymeric members. At least a portion of the interconnected thermoplastic polymeric members may be arranged in a repeating pattern, for example a pattern that repeats in two perpendicular directions, or example a regular three-dimensional lattice pattern with uniform repeating units. The thermoplastic polymeric members may have a cross-sectional shape that is circular, oval, square, rectangular, or other polygonal shape, or that is irregularly shaped.

The partial mold may be adjacent the structure before foaming begins or the structure may come into contact with a surface of the partial mold during foaming to prevent the structure from expanding further during foaming in the direction of the surface of the partial mold. The inert gas may be a noble gas, nitrogen, carbon dioxide, or any combination thereof. The thermoplastic polymeric members may be heated to the first temperature at a first pressure, then the pressure may be reduced to a second pressure less than the first pressure to allow the thermoplastic polymeric members to at least partially foam. The first pressure may be greater than atmospheric pressure.

A method of making a closed-cell foamed article, for example a foamed component for an article or footwear, comprises forming an article including a structure of interconnected, unfoamed, thermoplastic polymeric members spaced to define openings between the thermoplastic polymeric members. Each opening may have at least one dimension that is greater than at least one dimension of at least one adjacent unfoamed thermoplastic polymeric member. All or some of the openings may be interconnected. Thermoplastic members may enclose all or some of the openings. At least a portion of the interconnected thermoplastic polymeric members may be arranged in a repeating pattern, for example a pattern that repeats in two perpendicular directions, for example a regular three-dimensional lattice pattern with uniform repeating units. The structure may be made by printing a thermoplastic polymeric material with a three-dimensional printer in a unitary article of the interconnected thermoplastic polymeric members. The thermoplastic polymeric material may be a thermoplastic elastomer composition. The thermoplastic polymeric members may have a cross-sectional shape that is circular, oval, square, rectangular, or other polygonal shape, or that is irregularly shaped. In a first location, the thermoplastic polymeric members are heated to a first temperature below a temperature at which the structure collapses to soften the thermoplastic polymeric members and the softened thermoplastic polymeric members are infused with at least one inert gas at a first pressure. The inert gas may be a noble gas, nitrogen, carbon dioxide, or any combination thereof. The amount of inert gas infused into the thermoplastic polymeric members may be below or up to a saturation point. The first pressure is sufficient to cause the at least one inert gas to permeate into the softened thermoplastic polymeric members. The first pressure can be greater than atmospheric pressure. After being infused with the inert gas, the thermoplastic polymeric members are cooled to a second temperature, and the pressure is reduced, for example, to atmospheric pressure. The cooled structure is transferred to a partial mold in a second location; and the thermoplastic polymeric members are heated to a third temperature below a temperature at which the structure collapses to soften the thermoplastic polymeric members and at least partially foam the thermoplastic polymeric members, wherein a surface of the partial mold limits foam expansion in at least one direction but less than all directions. During this step, the pressure is a pressure at which the infused inert gas will partition out of the softened thermoplastic members, causing the softened thermoplastic to foam. The second location may be remote, such as a location in a different building from a building in which the article is infused with the at least one inert gas. The third temperature may be the same as or different from the first temperature. The thermoplastic polymeric members may be heated to the third temperature at a second pressure greater than atmospheric pressure, then the pressure may be reduced to a third pressure less than the second pressure to allow the thermoplastic polymeric members to at least partially foam.

A method of making a closed-cell foamed article, for example a foamed component for an article or footwear, comprises forming a structure comprising interconnected, unfoamed, thermoplastic polymeric members spaced to define openings between the thermoplastic polymeric members. Each opening may have at least one dimension that is greater than at least one dimension of at least one adjacent unfoamed thermoplastic polymeric member. All or some of the openings may be interconnected. Thermoplastic members may enclose all or some of the openings. At least a portion of the interconnected thermoplastic polymeric members may be arranged in a repeating pattern, for example a pattern that repeats in two perpendicular directions, for example a regular three-dimensional lattice pattern with uniform repeating units. The article may be made by printing a thermoplastic polymeric material with a three-dimensional printer as an article of the interconnected thermoplastic polymeric members. The thermoplastic polymeric material may be a thermoplastic elastomer composition. The thermoplastic polymeric members may have a cross-sectional shape that is circular, oval, square, rectangular, or other polygonal shape, or that is irregularly shaped. The foamable article may include portions other than the thermoplastic polymeric members, which portions may be interior or exterior portions. An interior portion may be, for example, an interior solid portion of regular geometric shape or of irregular shape. An exterior portion may form at least a portion of a side or perimeter of the article, which may be of uniform or non-uniform thickness, and which may include extensions into the article. The article may include a first kind of interconnected thermoplastic polymeric members that are softened and infused with the at least one inert gas and a second kind of interconnected thermoplastic polymeric members that are not softened and/or infused with the at least one inert gas under the conditions at which the first kind of interconnected thermoplastic polymeric members are softened and infused. These features may be included in the article by using more than one material in printing the article by three-dimensional printing. The thermoplastic polymeric members are heated to a first temperature below a temperature at which the structure collapses to soften the thermoplastic polymeric members and the softened thermoplastic polymeric members are infused with at least one inert gas at a first pressure greater than atmospheric pressure. The inert gas may be a noble gas, nitrogen, carbon dioxide, or any combination thereof. The amount of inert gas infused into the thermoplastic polymeric members may be below or up to a saturation point. The first pressure is sufficient to cause the at least one inert gas to permeate into the softened thermoplastic polymeric members. The pressure is reduced to second pressure below the first pressure while the first polymeric resin is or remains at or below a temperature at which the structure collapses and at which the thermoplastic polymeric members are softened to at least partially foam the thermoplastic polymeric members, wherein a surface of a partial mold limits foam expansion in at least one direction but less than all directions.

The foamed article made with the partial mold may be subjected to a second foaming step by heating the at least partially foamed, thermoplastic article to a second temperature to soften the thermoplastic article and infusing the softened thermoplastic article with at least one inert gas at a third pressure that is sufficient to cause the at least one inert gas to permeate into the softened article, and then reducing the pressure to fourth pressure below the second pressure while the first polymeric resin is or remains at a temperature at which the article is softened to further foam the thermoplastic article, optionally again using a surface of a partial mold to limit foam expansion in at least one direction but less than all directions. The third pressure may be greater than atmospheric pressure. The second temperature may be the same as or different from the first temperature. The at least one inert gas used in the second foaming step may be the same as or different from the inert gas used in the original foaming step. Suitable examples of the inert gas are again noble gasses, nitrogen, carbon dioxide, or any combination of these. The amount of inert gas infused into the thermoplastic article may be below or up to a saturation point. The third pressure is sufficient to cause the at least one inert gas to permeate into the softened thermoplastic polymeric members and can be the same as or different from the first pressure. The pressure is reduced to fourth pressure below the first pressure while the first polymeric resin is or remains at or below a temperature at which a structure of the article made of thermoplastic polymeric members collapses to further foam the thermoplastic article. The fourth pressure can be the same as or different from the second pressure. The second foaming step can produce a foamed article of a lower density. The second foaming step may also be used for further shaping the foamed article, for example when the second foaming step is carried out in a mold or with a partial mold.

In any of these methods, the partial mold may be incorporated in or attached to the foamed article during the foaming step.

The disclosed methods allow a foamed article of a desired shape to be made without tooling for injection molding a foam into a desired shape. The thermoplastic polymeric members of the disclosed methods can be selected to have dimensions that facilitate adsorption of the inert gas and provide desired cushioning, support, and impact resistance with inexpensive equipment in molding the foam.

When the article includes thermoplastic polymeric members, the structure should not collapse when the article is heated to a temperature to soften the thermoplastic polymeric members to infuse them with the at least one inert gas or to cause the infused polymeric members to foam. The structure is considered to have collapsed if the total combined volume of its openings decreases more than 50% as a result of deformation of its polymeric members from the heat. It is desirable for the total combined volume of openings of the structure to decrease by not more than 20% or by not more than 10% or by not more than 5% or by not more than 1% or not to decrease by any noticeable amount (substantially 0%). The article or any thermoplastic polymeric members of the article may have a cross-sectional shape that is generally circular, oval, square, rectangular, or other polygonal shape, or that is irregularly shaped. "Generally" is used here to indicate an overall shape that may have imperfections and irregularities, such as bumps, dents, and so on.

The foamed article may be a midsole or midsole pre-form for an article of footwear. The foamed article may be incorporated as cushioning into other articles. As nonlimiting examples, the foamed article may be a foamed element in footwear, such as a part of a footwear upper, such as a foamed element in a collar, a midsole or a part of a midsole, or an outsole or a part of an outsole; foam padding in shinguards, shoulder pads, chest protectors, masks, helmets or other headgear, knee protectors, and other protective equipment; an element placed in an article of clothing between textile layers; or may be used for other known padding applications for protection or comfort, such as for a pillow, cushion, or in an article or furniture. In various embodiments, the molded article is a midsole for an article of footwear. A midsole provides cushioning in the footwear. A midsole should be durable but also preferably adds as little weight as possible to the footwear while still cushioning to the desired degree. A midsole also should be able to be bonded to an outsole, an upper, or any other components (e.g., a shank, an airbag, or decorative components) in making an article of footwear.

As used in this description, "a," "an," "the," "at least one," and "one or more" indicate interchangeably that at least one of the item is present; a plurality of such items may be present unless the context unequivocally indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the technological field with this ordinary meaning, then "about" as used herein indicates at least variations that may arise from ordinary methods of measuring and using such parameters. In addition, disclosures of ranges are to be understood as specifically disclosing all values and further divided ranges within the range. The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items.

The thermoplastic article is made from a thermoplastic polymeric composition. The thermoplastic article can be made by one or more forming methods, including molding, cutting, extrusion, and three-dimensional printing. The thermoplastic article may be or include a structure of interconnected thermoplastic polymeric members spaced to define openings between the thermoplastic polymeric members can be formed by three-dimensional printing a thermoplastic polymeric composition. A thermoplastic polymeric composition, which may include a thermoplastic elastomer, and which is suitable for foaming with at least one inert gas, can be extruded into a length (a "filament") having an appropriate cross-section for processing through a three-dimensional fabricator or printer. The three-dimensional fabricator deposits a melt of the thermoplastic polymeric composition in a pre-determined pattern onto a surface in a process that is also known as three-dimensional printing. The process is described in detail in a number of publications, for example in US Patent Application Publication No. 2012/0241993, which is incorporated herein by reference. Three-dimensional fabrication or printing equipment is available commercially, for example from MakerBot under the tradename REPLICATOR.

The thermoplastic polymeric composition can include any thermoplastic polymer, including thermoplastic elastomers that are suitable for the intended use of the foamed article to be made. Nonlimiting examples of suitable thermoplastic polymers and elastomers include thermoplastic polyurethane elastomers, thermoplastic polyurea elastomers, thermoplastic polyamide elastomers (PEBA or polyether block polyamides), thermoplastic polyester elastomers, metallocene-catalyzed block copolymers of ethylene and α-olefins having 4 to about 8 carbon atoms, and styrene block copolymer elastomers such as poly(styrene-butadiene-styrene), poly(styrene-ethylene-co-butylene-styrene), and poly(styrene-isoprene-styrene).

Thermoplastic polyurethane elastomers may be selected from thermoplastic polyester-polyurethanes, polyether-polyurethanes, and polycarbonate-polyurethanes, including, without limitation, polyurethanes polymerized using as polymeric diol reactants polyethers and polyesters including polycaprolactone polyesters. These polymeric diol-based polyurethanes are prepared by reaction of a polymeric diol (polyester diol, polyether diol, polycaprolactone diol, polytetrahydrofuran diol, or polycarbonate diol), one or more polyisocyanates, and, optionally, one or more chain extension compounds. Preferably the polymeric diol-based polyurethane is substantially linear (i.e., substantially all of the reactants are difunctional). Diisocyanates used in making the polyurethane elastomers may be aromatic or aliphatic, and examples include, without limitation, isophorone diisocyanate (IPDI), methylene bis-4-cyclohexyl isocyanate (H.sub.12MDI), cyclohexyl diisocyanate (CHDI), m-tetramethyl xylene diisocyanate (m-TMXDI), p-tetramethyl xylene diisocyanate (p-TMXDI), 4,4'-methylene diphenyl diisocyanate (MDI, also known as 4,4'-diphenylmethane diisocyanate), 2,4- or 2,6-toluene diisocyanate (TDI), ethylene diisocyanate, 1,2-diisocyanatopropane, 1,3-diisocyanatopropane, 1,6-diisocyanatohexane(hexamethylene diisocyanate or HDI), 1,4-butylene diisocyanate, and the like, which may be used in combinations. Chain extension compounds, or extenders, have two functional groups reactive with isocyanate groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders may range from about 60 to about 400. Alcohols and amines are typically used. Examples of useful diols include ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; cyclohexanedimethanol, 1,6-hexanediol, 2-ethyl-1,6-hexanediol, 1,4-butanediol, 2,3-butanediol, 1,5-pentanediol, 1,3-propanediol, butylene glycol, neopentyl glycol, and combinations of these. Suitable diamine extenders include, without limitation, ethylene diamine, diethylene triamine, triethylene tetraamine, and combinations of these. Other typical chain extenders are amino alcohols such as ethanolamine, propanolamine, butanolamine, and combinations of these.

The polyester diols used in forming a thermoplastic polyurethane elastomer are in general prepared by the condensation polymerization of one or more polyacid compounds and one or more polyol compounds. Preferably, the polyacid compounds and polyol compounds are di-functional, i.e., diacid compounds and diols are used to prepare substantially linear polyester diols, although minor amounts of mono-functional, tri-functional, and higher functionality materials (perhaps up to 5 mole percent) can be included to provide a slightly branched, but uncrosslinked polyester polyol component. Suitable dicarboxylic acids include, without limitation, glutaric acid, succinic acid, malonic acid, oxalic acid, phthalic acid, hexahydrophthalic acid, adipic acid, maleic acid, suberic acid, azelaic acid, dodecanedioic acid, their anhydrides and polymerizable esters (e.g., methyl esters) and acid halides (e.g., acid chlorides), and mixtures of these. Suitable polyols include those already mentioned, especially the diols. In preferred embodiments, the carboxylic acid component includes one or more of adipic acid, suberic acid, azelaic acid, phthalic acid, dodecanedioic acid, or maleic acid (or the anhydrides or polymerizable esters of these) and the diol component includes one or more of includes 1,4-butanediol, 1,6-hexanediol, 2,3-butanediol, or diethylene glycol. Typical catalysts for the esterification polymerization are protonic acids, Lewis acids, titanium alkoxides, and dialkyltin oxides. Polylactones, such as polycaprolactone diol, may also be used.

A polymeric polyether may be obtained by reacting a diol initiator, e.g., 1,3-propanediol or ethylene or propylene glycol, with alkylene oxide chain-extension reagent. Polyethylene oxide (also called polyethylene glycol), polypropylene oxide (also called polypropylene glycol), and block polyethylene oxide-polypropylene oxide copolymers may be used. Two or more different alkylene oxide monomers may be randomly copolymerized by coincidental addition or polymerized in blocks by sequential addition. Tetrahydrofuran may be polymerized by a cationic ring-opening reaction initiated by formation of a tertiary oxonium ion. Polytetrahydrofuran is also known as polytetramethylene ether glycol (PTMEG).

Aliphatic polycarbonate diols that may be used in making a thermoplastic polyurethane elastomer are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

The polymeric diol preferably has a weight average molecular weight of at least about 500, more preferably at least about 1000, and even more preferably at least about 1800 and a weight average molecular weight of up to about 10,000, but polymeric diols having weight average molecular weights of up to about 5000, especially up to about 4000, may also be preferred. The polymeric diol advantageously has a weight average molecular weight in the range from about 500 to about 10,000, preferably from about 1000 to about 5000, and more preferably from about 1500 to about 4000. The weight average molecular weights may be determined by ASTM D-4274. The polymeric diol segments typically are from about 35% to about 65% by weight of the polyurethane polymer, and preferably from about 35% to about 50% by weight of the polyurethane polymer.

Suitable thermoplastic polyurea elastomers may be prepared by reaction of one or more polymeric diamines with one or more of the polyisocyanates already mentioned and one or more of the diamine extenders already mentioned. Polymeric diamines include polyoxyethylene diamines, polyoxypropylene diamines, poly(oxyethylene-oxypropylene)diamines, and poly(tetramethylene ether)diamines.

Suitable thermoplastic polyamide elastomers may be obtained by: (1) polycondensation of (a) a dicarboxylic acid, such as oxalic acid, adipic acid, sebacic acid, terephthalic acid, isophthalic acid, 1,4-cyclohexanedicarboxylic acid, or any of the other dicarboxylic acids already mentioned with (b) a diamine, such as ethylenediamine, tetramethylenediamine, pentamethylenediamine, hexamethylenediamine, or decamethylenediamine, 1,4-cyclohexanediamine, m-xylylenediamine, or any of the other diamines already mentioned; (2) a ring-opening polymerization of a cyclic lactam, such as .epsilon.-caprolactam or co-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine to prepare a carboxylic acid-functional polyamide block, followed by reaction with a polymeric ether diol (polyoxyalkylene glycol) such as any of those already mentioned. Polymerization may be carried out, for example, at temperatures of from about 180.degree.C. to about 300.degree.C. Specific examples of suitable polyamide blocks include NYLON 6, NYLON 66, NYLON 610, NYLON 11, NYLON 12, copolymerized NYLON, NYLON MXD6, and NYLON 46.

Thermoplastic polyester elastomers have blocks of monomer units with low chain length that form the crystalline regions and blocks of softening segments with monomer units having relatively higher chain lengths. Thermoplastic polyester elastomers are commercially available under the tradename HYTREL from DuPont.

Metallocene-catalyzed block copolymers of ethylene and a-olefins having 4 to about 8 carbon atoms are prepared by single-site metallocene catalysis of ethylene with a softening comonomer such as hexane-1 or octene-1, for example in a high pressure process in the presence of a catalyst system comprising a cyclopentadienyl-transition metal compound and an alumoxane. Octene-1 is a preferred comonomer to use. These materials are commercially available from ExxonMobil under the tradename Exact™ and from the Dow Chemical Company under the tradename Engage™.

Styrene block copolymer elastomers such as poly(styrene-butadiene-styrene), poly(styrene-ethylene-co-butylene-styrene), and poly(styrene-isoprene-styrene) may be prepared may anionic polymerization in which the polymer segments are produced sequentially, first by reaction of an alkyl-lithium initiator with styrene, then continuing polymerization by adding the alkene monomer, then completing polymerization by again adding styrene. S-EB-S and S-EP-S block copolymers are produced by hydrogenation of S-B-S and S-I-S block copolymers, respectively.

When the foamable article is formed onto a surface by depositing the thermoplastic polymeric composition in a pre-determined three-dimensional shape by three-dimensional printing with a three-dimensional fabricator, the article may include a structure of interconnected thermoplastic polymeric members spaced to define openings between them.

Each opening may be from about 0.5 mm or from about 1 mm or from about 2 mm to about 5 mm or to about 8 mm or to about 10 mm in each of its dimensions. The size of the openings can range from 0.5 mm to 10 mm. The size of the openings can range from 1 mm to 10 mm. The size of the openings can range from 1 mm to 8 mm. The size of the openings can range from 2 mm to 5 mm. Each opening may have at least one dimension that is greater than at least one dimension of at least one adjacent unfoamed thermoplastic polymeric member. For example, when the thermoplastic polymeric members have a circular circumference, the adjacent openings may have at least one dimension that is greater than the diameter of a cross-section. In another example, a pattern in which the members have thin rectangular shapes, the spaces may have a smallest dimension that is greater than the thickness of the adjacent thermoplastic polymeric members. The openings may be generally elongated in shape, and may be joined in a generally continuous path between openings in different or opposite faces or surfaces of the article. Each face of the article may have a plurality of openings, which may be generally regularly spaced from one another. Opposite faces may have openings arranged in a same pattern.

In a structure of interconnected thermoplastic polymeric members spaced to define openings between the thermoplastic polymeric members, each opening may have at least one dimension that is greater than at least one dimension of at least one adjacent unfoamed thermoplastic polymeric member. All or some of the openings may be interconnected. All or some of the openings may be enclosed by thermoplastic members. At least a portion of the interconnected thermoplastic polymeric members may be arranged in a repeating pattern, for example a pattern that repeats in two perpendicular directions, for example a regular three-dimensional lattice pattern with uniform repeating units. The structure may be made by printing a thermoplastic polymeric material with a three-dimensional printer in a unitary article of the interconnected thermoplastic polymeric members. The thermoplastic polymeric material may be a thermoplastic elastomer composition. The thermoplastic polymeric members may have a cross-sectional shape that is generally circular, oval, square, rectangular, or other polygonal shape, or that is irregularly shaped. "Generally" is used here to indicate an overall shape that may have imperfections and irregularities, such as bumps, dents, and so on.

The sizes of the openings defined by the interconnected, thermoplastic polymeric members are reduced during the foaming process. In one example, the foamed thermoplastic polymeric members may foam to a size where some or all are adjacent to other foamed thermoplastic polymeric members. In another example, spaces remain between the thermoplastic polymeric members after foaming.

For example, the thermoplastic polymeric members may be arranged in a pattern that repeats in two directions perpendicular to one another. The pattern may have at least three repeating units in sequence in at least one direction. The repeating units may be uniform, for example cubes or other geometric shapes that are of a same size, or the repeating units may vary in a regular or irregular pattern. As an example of a varying pattern, a circular pattern may expand from a center in a plane or in three-dimensions.

The partial mold can be put in place before or after the thermoplastic article is infused with the inert gas, but before the article is foamed. The partial mold may be or include the surface on which the article is formed by three-dimensional printing.

A partial mold is a mold that, during the expansion that results in the foaming process, only constrains the article (which may be or include a three-dimensional open lattice structure) in at least one but less than all directions. The partial mold can be a flat sheet of material onto which the thermoplastic polymeric article is deposited or formed, but from which the foamed product can be released following the foaming. In one example, the partial mold can be a mold with a bottom and side molding surfaces, but no top molding surface. In another example, the partial mold can be a mold with constraints around all of a perimeter of the component to be formed. In a further example, the partial mold can be a mold with constraints around only part of a perimeter of the article being foamed. For example, when the partial mold is used to shape a midsole for footwear during foaming of the midsole, the partial mold may have only a left or right side of the midsole. If the partial mold constrains the material in two dimensions, the interface between the two dimensions may not be completely sealed, but could just be set on top of each other.

The partial mold can impart a molded pattern or decoration on at least a portion of the constrained surface of the component when foamed.

The partial mold can be put in place before the polymeric resin is deposited when forming the article by three-dimensional printing. The process of dispensing the polymeric resin can comprise dispensing the polymeric resin into the partial mold.

The partial mold can simultaneously mold a plurality of components (e.g., a number components laid down on a sheet pan with space between them, so that only their bottom surfaces are constrained, but there is sufficient space between them that they remain separated following foaming/expansion).

The partial mold can be a sacrificial mold, where the mold is destroyed during or following the manufacturing process. The mold can be made of a material that constrains the polymeric resin or foam for only for part of the manufacturing process, for example, a material which decomposes or melts or burns off or dissolves during the manufacturing process (wax, paper, cornstarch, salt, sugar, a polymer, etc.) either during or after the foaming step. The sacrificial mold can be formed of a material from which the foamed article can easily be released following the manufacturing process, for example, a sand form which can be easily broken apart, or a material which can be decomposed, melted, burned off or dissolved following the manufacturing process.

The partial mold can be an article to which at least a portion of the polymeric resin or foam adheres during the manufacturing process, and which may become part of the component formed during the manufacturing process. The partial mold may adhere to the polymeric resin during the foaming step (as the polymeric resin foams and expands). For example, the partial mold could be a midsole component such as an airbag, or could be an outsole component, such as a rubber component that forms at least part of an outsole of an article of footwear. The partial mold could be a thin, clear polymer piece such as a vacuum formed polymer component for forming a side of an outsole. The partial mold can be removed during manufacturing, imparting its shape to the final foamed article, or can remain present and form an outer surface of the overall component.

The partial mold can be a thin, optionally clear, polymer piece such as a vacuum formed polymer component for forming a side of an outsole that has a decorative element (foil, paint, etc.) on at least a portion of its inner surface. The partial mold can be removed during manufacturing, leaving the decorative element present on an outer surface of the foamed article, or can remain present and form an outer surface of the overall component.

The article, which may include a structure of interconnected thermoplastic polymeric members, is made foamable by heating the article to a first temperature (which is below a temperature at which any structure of interconnected thermoplastic polymeric members collapses) to soften the article and infusing the softened article with at least one inert gas at a first pressure greater than atmospheric pressure that is sufficient to cause the at least one inert gas to permeate into the softened article. The inert gas may be a noble gas, nitrogen, carbon dioxide, or any combination of these. The first pressure is sufficient to cause the at least one inert gas to permeate into the softened article. The first exposure is at a pressure and for a length of time sufficient for an amount of the gas to permeate into the softened article to cause at least partial foaming when the pressure is reduced when the article is softened. The amount of gas required may depend upon factors such as the surface area of the article, the type of polymer, the pressure, and the temperature. The infusing step may be continued until the point of saturation of the article with the gas.

The article infused with the inert gas may then be cooled to a second temperature. The second temperature is one at which the gas with not significantly foam the article in a desired length of time. For example, the second temperature may be at or below about 30.degree.C. Then, the pressure may be reduced to atmospheric pressure. The article then is a foamable article. The article can be removed from the pressure vessel and transferred to another location, for example to a partial mold in the same building or manufacturing site or transferred to a partial mold at a remote site, before it is foamed in the partial mold that limits foam expansion in at least one direction but less than all directions. The article is foamed by heating the article to a second temperature to soften the article to cause the thermoplastic polymeric members to at least partially foam adjacent or near to a surface of a partial mold that limits foam expansion in at least one direction but less than all directions during foaming. When the article includes a structure of thermoplastic polymeric members, the second temperature is at or below a temperature at which the structure collapses. The second temperature may be the same as or different from the first temperature at which the article was infused with the inert gas. Once the second temperature is reached, the pressure is reduced to a second pressure or released (returned to atmospheric temperature) to cause the thermoplastic polymeric members to foam in the partial mold.

The article infused with the inert gas may instead be foamed immediately after infusion of the inert gas in the partial mold without interim cooling. Once the softened thermoplastic article has been infused with the at least one inert gas, the pressure is reduced to a second pressure below the first pressure (while the article is below a temperature at which a structure of thermoplastic polymeric members would collapse, if it contains such a structure) to at least partially foam the article in a partial mold. The article remains softened while foaming. For example, the second pressure may be atmospheric pressure.

When the article is foaming, expansion of the article in one or more but less than all directions is constrained by being in direct contact with or coming into direct contact with at least one surface of the partial mold. The foaming article at least partially conforms to the at least one surface as it presses against the surface during foaming, expanding in one or more of the unconstrained directions.

The article can comprise a second polymeric resin. The second polymeric resin can expand and at least partially foam during the manufacturing, optionally at a different rate than the first polymeric resin, or can remain as a solid resin. The second polymeric resin can expand and at least partially foam at the same expansion ratio as the first polymeric resin (so that it expands to the relative dimension as the first resin), or may have a different expansion ratio (so that it expands more or less than the first resin).

The foamable thermoplastic article may be foamed a second time by repeating the process. The at least partially foamed, thermoplastic article is heated to a second temperature (which is below a temperature at which any structure of thermoplastic polymeric members collapses) to soften the thermoplastic article and the softened thermoplastic article is again infused with at least one inert gas at a third pressure that is sufficient to cause the at least one inert gas to permeate into the softened thermoplastic article, then the pressure is reduced to a fourth pressure below the third pressure while the thermoplastic article is softened to further foam the thermoplastic article, optionally in the same partial mold or in a second partial mold. A surface unconstrained during the first foaming process may be constrained by a surface of the partial mold during the second foaming process, and vice versa. The third pressure may be greater than atmospheric pressure. The second temperature may be the same as or different from the first temperature at which the thermoplastic article was softened and infused during the original foaming process. The inert gas used in the second foaming process may be the same as or different from the inert gas used to originally at least partially foam the article. Thus, the inert gas may be a noble gas, nitrogen, carbon dioxide, or any combination of these. The amount of inert gas infused into the thermoplastic article may be up to a saturation point. The third pressure may be the same as or different from the first pressure used in the original infusing step process, so long as it is sufficient to cause the at least one inert gas to permeate into the softened thermoplastic article. The pressure can be reduced to a fourth pressure while the thermoplastic article is softened to allow the thermoplastic article to further foam, optionally in the same or a second partial mold. The fourth pressure may be atmospheric pressure.

The article may include a portion that is not infused with the at least one inert gas and thus not subsequently foamed. The unfoamed portion may be polymeric or nonpolymeric. If the unfoamed portion is polymeric, either the unfoamed portion does not soften when exposed to the first temperature and pressure, does not soften when exposed to the second temperature and pressure, or else does not foam when exposed to the second temperature/pressure. The unfoamed portion may be in the form of a solid internal or surface portion of the article or may be a second structure of thermoplastic polymeric members. An internal structural portion may be, for example, a single solid portion. An exterior structural portion may be, for example, a solid outer member forming a face of the article.

The closed-cell foamed article may have a top outer surface, an opposite bottom outer surface, and at least one side outer surface having a common edge with at least one of the top outer surface and the bottom surface, wherein the side outer surface is free of openings. At least one surface is shaped by the partial mold.

Among the foamed articles that may be made in this way are footwear uppers, footwear collars, footwear tongues, footwear insoles, footwear midsoles, shinguards, shoulder pads, chest protectors, masks, helmets, headgear, knee protectors, articles of clothing, straps; furniture cushions, and bicycle seats.

Figure 1:
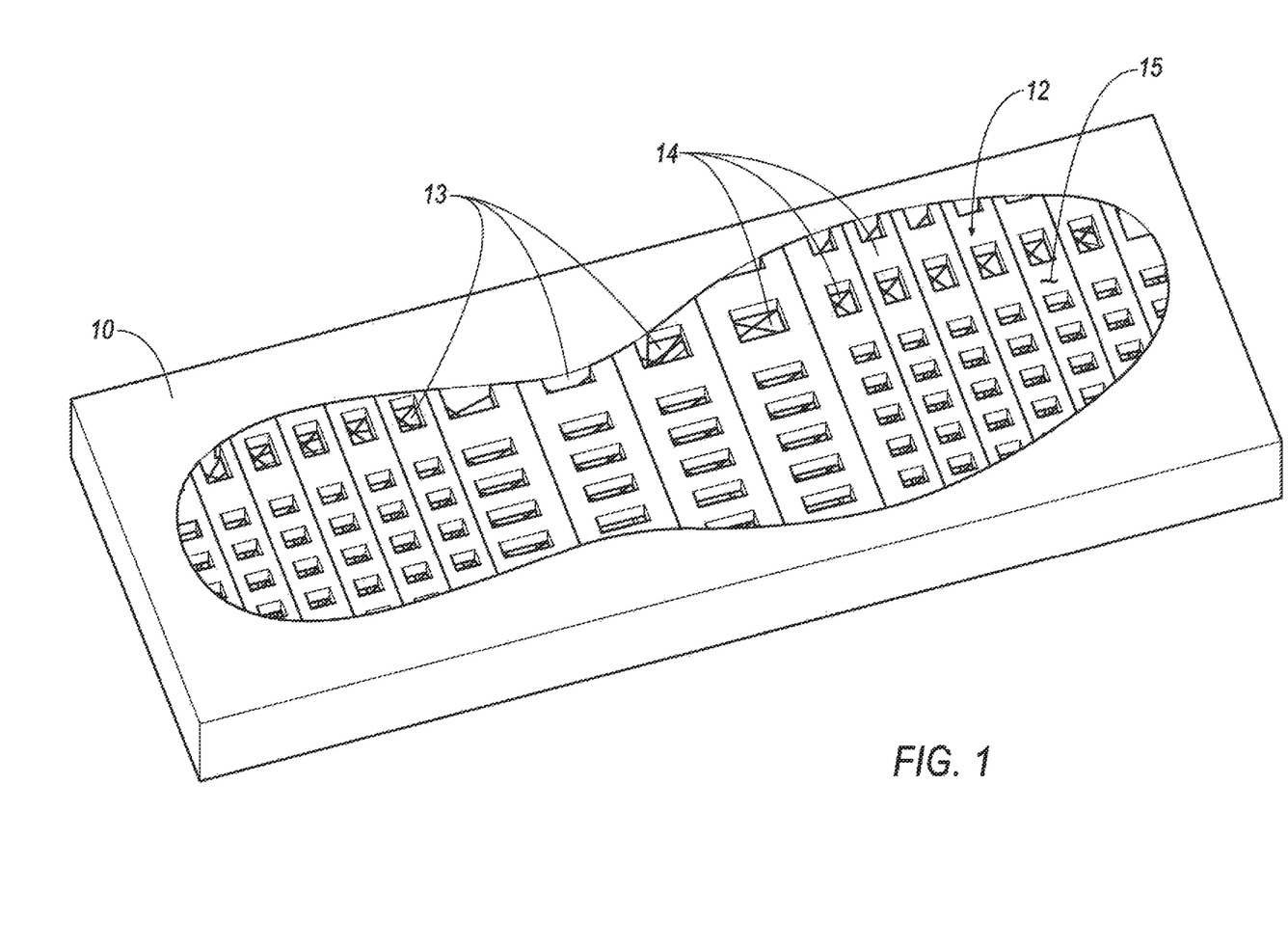
FIG. 1 is a perspective view of an example according to the disclosed technology.

FIG. 1 shows a first partial mold 10 containing a first foamed article 12. Article 12 is shaped as a midsole for an article of footwear and has openings 13 between foamed, thermoplastic polymeric members 14. Top surface 15 was not constrained during foaming.

Figure 2:
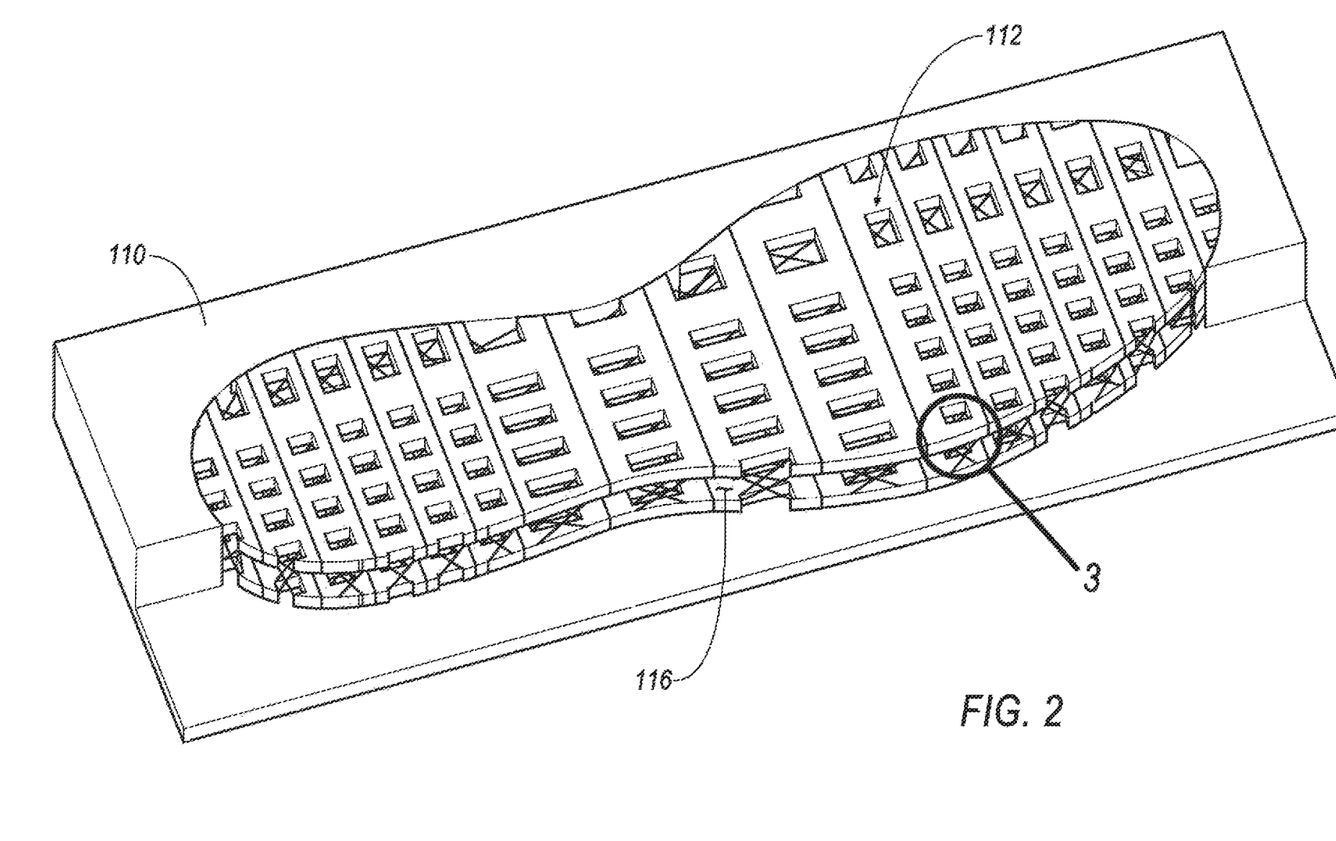
FIG. 2 is a perspective view of a second example of the disclosed technology.
Figure 3A:
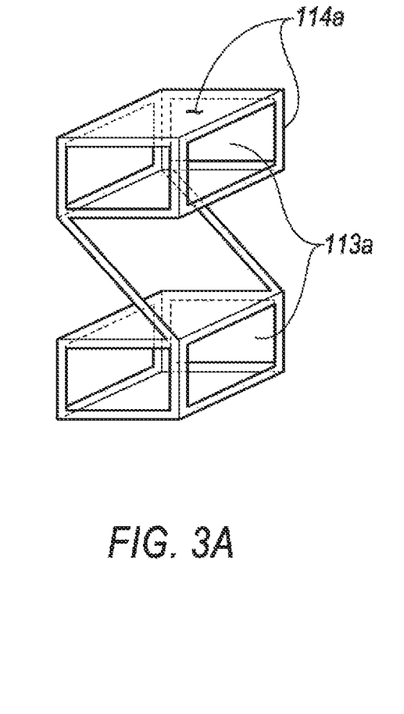
FIGS. 3A-3F are examples of components 3 of FIG. 2.
Figure 3B:
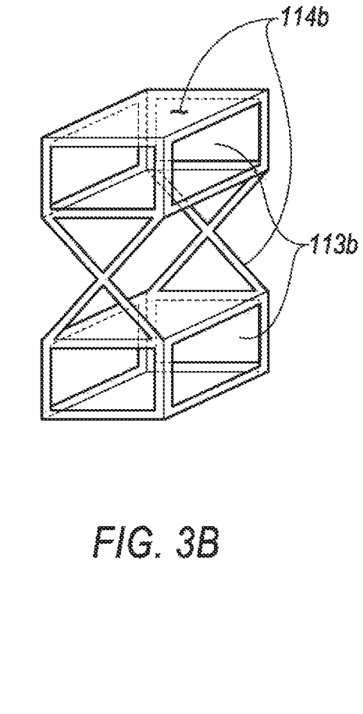
Figure 3C:
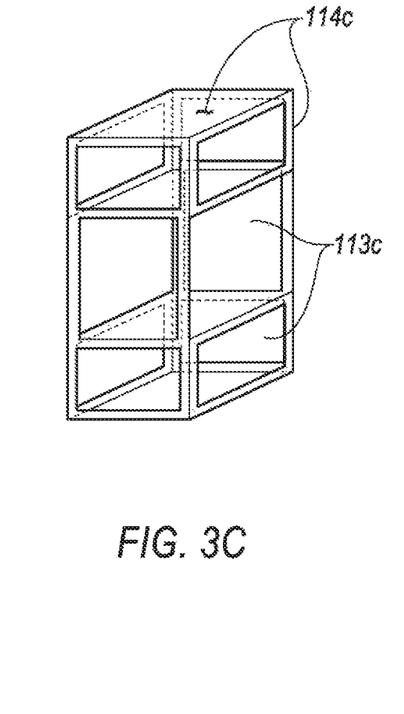
Figure 3D:
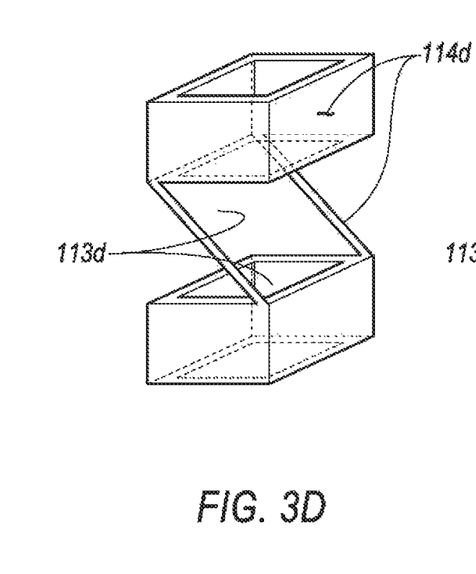
Figure 3E:
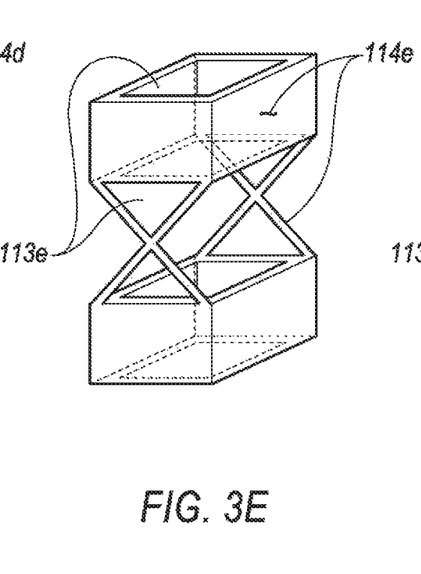
Figure 3F:
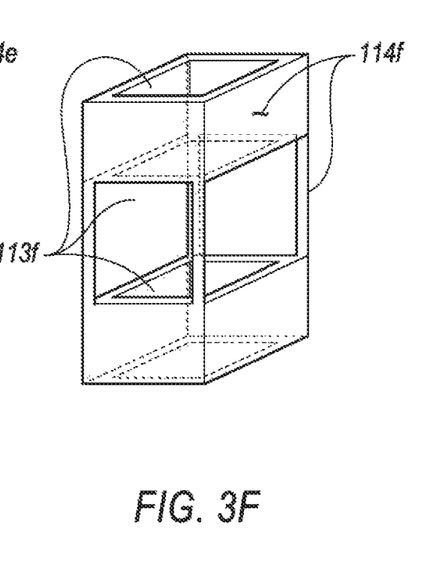

FIG. 2 shows another example of a partial mold, partial mold 110, partially containing midsole article 112. Side 116 of midsole article 112 is not constrained during foaming. Midsole article 112 is three-dimensionally printed using an elastomeric thermoplastic polymer composition into structures 3. Structures 3 may be printed in various different configurations, sizes and shapes for example as shown in FIGS. 3A, 3B, and 3C, which have interconnected thermoplastic polymeric members 114a, 114b, and 114c separated by spaces 113a, 113b, and 113c forming structures 3 with solid top and bottom portions but open sides; or as shown in FIGS. 3D, 3E, and 3F, which have interconnected thermoplastic polymeric members 114d, 114e, and 114f separated by spaces 113d, 113e, and 113f forming structures 3 with solid sides and open tops and bottoms.

Figure 4:
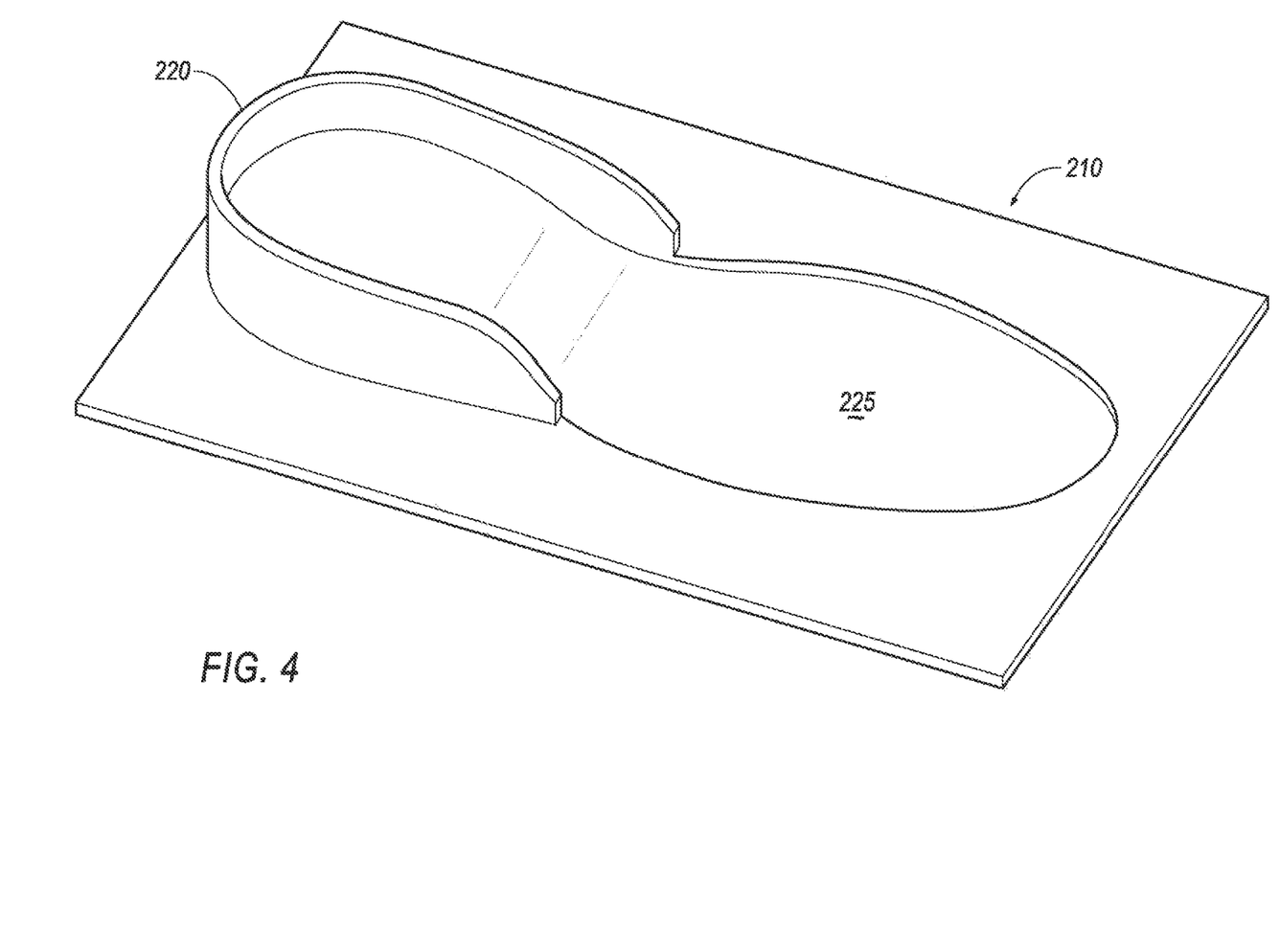
FIG. 4 is a perspective view of an example of a partial mold.

FIG. 4 illustrates an example partial mold 210 that may be used in foaming a midsole for an article of footwear. Partial mold 210 has a recessed portion 225 to shape a bottom surface and sides of a midsole and a raised portion 220 to shape a side of the midsole in the sides of the back half of the midsole.

Figure 5:
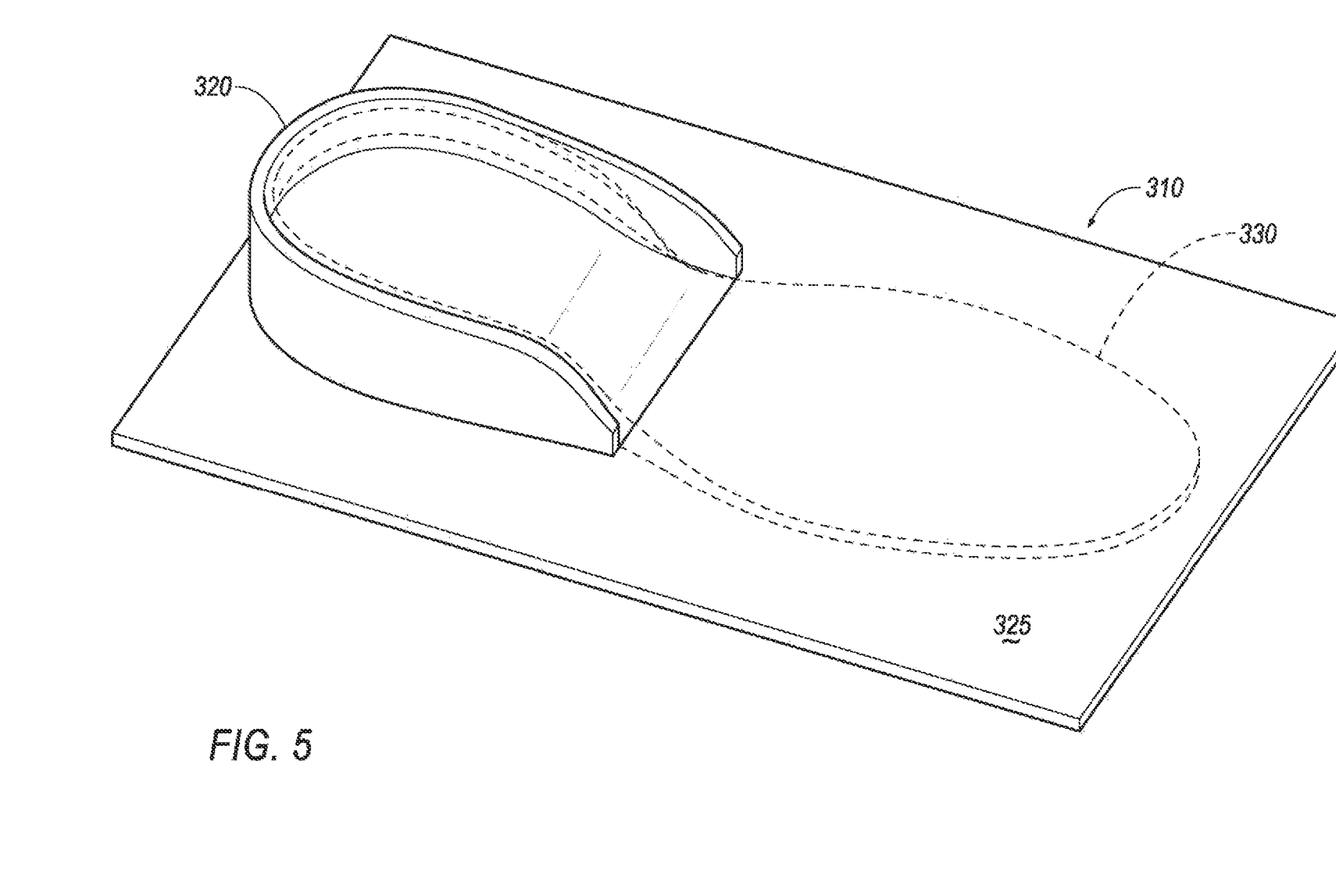
FIG. 5 is a perspective view of a second example of a partial mold.

FIG. 5 illustrates an example partial mold 310 that may be used in foaming a midsole for an article of footwear. Partial mold 310 has a flat surface 325 to shape a bottom surface of a midsole (which may be positioned as shown in dotted outline 330) and a raised portion 320 to shape a side of the midsole in the sides of the back half of the midsole.

Among the foamed articles that may be made in this way are footwear uppers, footwear collars, footwear tongues, footwear insoles, footwear midsoles, shinguards, shoulder pads, chest protectors, masks, helmets, headgear, knee protectors, articles of clothing, straps; furniture cushions, and bicycle seats.

The foregoing description of particular embodiments illustrate features of the invention, but the invention is not limited to any of the specific embodiments that have been described.

The features described for particular embodiments are interchangeable and can be used together, even if not specifically shown or described. The same may also be varied in many ways. The invention broadly includes such variations and modifications.

What is claimed is:

1. A method of making a closed-cell foamed article comprising
   a) forming an unfoamed article at a first location using a three-dimensional printing process, the unfoamed article comprising unfoamed, thermoplastic polymer deposited as interconnected, unfoamed, thermoplastic polymeric members spaced to define openings therebetween;
   b) heating the unfoamed article to a first temperature to soften the unfoamed article and infusing the softened unfoamed article with at least one inert gas at a first pressure that is sufficient to cause the at least one inert gas to permeate into the softened unfoamed article;
   c) cooling the unfoamed article to a second temperature and reducing the pressure to a second pressure;
   d) transferring the cooled unfoamed article to a partial mold at a second location; and
   e) heating the unfoamed article in the partial mold to a third temperature to soften the unfoamed article and at least partially foam the unfoamed article, wherein pressure is adjusted to a third pressure sufficient to allow the infused inert gas to partition out of the softened unfoamed article to at least partially foam the unfoamed article into a foamed article, and wherein a surface of a partial mold limits foam expansion in at least one direction but less than all directions.

2. A method according to claim 1, wherein the third temperature is the same as the first temperature.

3. A method according to claim 1, wherein the third temperature is different from the first temperature.

4. A method according to claim 1, wherein the pressure is greater than atmospheric during heating of the unfoamed article to the third temperature and is reduced to the third pressure less than the second pressure after heating to the third temperature to at least partially foam the unfoamed article.

5. A method according to claim 1, wherein the surface of the partial mold that limits foam expansion is flat and optionally includes one or more spaces through which the unfoamed article can expand beyond the surface during foaming.

6. A method according to claim 1, wherein outer surfaces of the unfoamed article before the foaming step define a top, a bottom opposite the top, and an outer circumference between the top and the bottom; and further wherein the partial mold limits foam expansion of at least a part of the outer circumference.

7. A method according to claim 6, wherein the partial mold limits foam expansion to expansion in directions of the top and the bottom.

8. A method according to claim 1, wherein the partial mold has a bottom surface and side surfaces that limit foam expansion and is open in a direction opposite the bottom surface.

9. A method according to claim 8, wherein the partial mold has a first mold part comprising the bottom surface and a second mold part comprising the side surfaces, wherein the first mold part and the second mold part are adjacent but not conjoined.

10. A method according to claim 9, further comprising after step e) moving the second mold part away from the first mold part before unmolding the foamed article from the second mold part.

11. A method according to claim 1, wherein the partial mold has a surface that imparts a pattern or decoration on at least a portion of the foamed article.

12. A method according to claim 1, wherein the partial mold comprises a bottom portion and a side portion.

13. A method according to claim 12, wherein the side portion incompletely surrounds the unfoamed article.

14. A method according to claim 12, wherein the partial mold is in a shape of a midsole for footwear.

15. A method according to claim 1, wherein the partial mold comprises adjacent sections that separate during foaming and while forming the foamed article.

16. A method according to claim 1, wherein a portion of the partial mold becomes attached to the foamed article.

17. A method according to claim 16, wherein the foamed article is a midsole for footwear having a first major surface and a second major surface opposite the first major surface, wherein the portion of the partial mold becomes attached to the first major surface or to the second major surface.

18. A method according to claim 1, wherein at least a portion of the interconnected, unfoamed, thermoplastic polymeric members are arranged in a repeating pattern comprising repeating units.

19. A method according to claim 18, wherein the repeating pattern repeats in two directions perpendicular to one another.

20. A method according to claim 18, wherein the repeating units are uniform.

* * * * *